US006921033B2

(12) United States Patent
Reiter

(10) Patent No.: US 6,921,033 B2
(45) Date of Patent: Jul. 26, 2005

(54) FUEL INJECTION VALVE

(75) Inventor: Ferdinand Reiter, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/275,024

(22) PCT Filed: Feb. 27, 2002

(86) PCT No.: PCT/DE02/00694

§ 371 (c)(1),
(2), (4) Date: Apr. 4, 2003

(87) PCT Pub. No.: WO02/068814

PCT Pub. Date: Sep. 6, 2002

(65) Prior Publication Data

US 2003/0155446 A1 Aug. 21, 2003

(30) Foreign Application Priority Data

Feb. 28, 2001 (DE) ........................................ 101 09 407

(51) Int. Cl.$^{7}$ ........................ F02M 39/00; F02M 59/00; F02M 61/00; F02M 63/00; F16J 15/02

(52) U.S. Cl. ................................ 239/533.2; 239/533.3; 239/585.1; 277/631; 123/470

(58) Field of Search ........................... 239/533.2, 585.1, 239/88–92, 533.3, 533.9, 533.11, 585.2–585.5; 277/631, 491, 493, 644, 495–498; 123/470, 467

(56) References Cited

U.S. PATENT DOCUMENTS 1,392,536 A * 10/1921 Syfert ........................ 277/441
1,495,909 A 5/1924 Kroczek
3,097,855 A * 7/1963 Allen ......................... 277/584
3,655,208 A * 4/1972 Walker ....................... 277/496
4,528,959 A * 7/1985 Hauser, Jr. .................. 123/470
4,713,867 A * 12/1987 Fox ....................... 29/888.073
5,247,918 A * 9/1993 Wakeman ................... 123/470
5,289,627 A * 3/1994 Cerny et al. ............... 29/602.1
5,660,398 A 8/1997 Terao et al.
5,779,243 A 7/1998 Hanlon
5,954,343 A 9/1999 Sumida et al.
6,076,802 A * 6/2000 Maier .................... 251/129.21
6,116,219 A * 9/2000 Girard ........................ 123/470
6,186,123 B1 * 2/2001 Maier et al. ................ 123/470

FOREIGN PATENT DOCUMENTS

DE 196 00 403 8/1996
DE 197 39 150 3/1999
JP 11-210886 8/1999

OTHER PUBLICATIONS

Patent Abstracts of Japan, vol. 1999, No. 13, Nov. 30, 1999.

* cited by examiner

*Primary Examiner*—David A. Scherbel
*Assistant Examiner*—Darren Gorman
(74) *Attorney, Agent, or Firm*—Kenyon & Kenyon

(57) ABSTRACT

A fuel injector, particularly for the direct injection of fuel into the combustion chamber of a mixture-compressing internal combustion engine having external ignition, include a valve housing formed by a nozzle body and a sealing ring which seals the fuel injector from a cylinder head of the internal combustion engine. The sealing ring has a convexly curved profile, two ends of the sealing ring axially overlapping one another in a stepped manner.

16 Claims, 2 Drawing Sheets

FUEL INJECTION VALVE

FIELD OF THE INVENTION

The present invention relates to a fuel injector for the direct injection of fuel into a mixture-compressing internal combustion engine.

BACKGROUND INFORMATION

German Published Patent Application No. 196 00 403 describes a conventional electromagnetic fuel injector and an appropriate structure for its mounting, which satisfy the requirements regarding the sealing effect, thermal resistance and pressure resistance for an internal combustion engine having direct fuel injection. Particular attention is paid in this context to sealing the area immediately adjacent to the cylinder where the electromagnetic fuel injector is mounted, as well as to a region more distant therefrom. As a result, according to the present invention, a first sealing section having a first sealing ring, which is configured as a wavy washer, is located close to the cylinder and between the fuel injector and the cylinder head. Moreover, a second sealing section having a second sealing ring, which is also configured as a wavy washer, is located further away from the cylinder than the first sealing section.

The fuel injector described in German Published Patent Application No. 196 00 403 has the disadvantage of high production complexity of the sealing rings. Furthermore, due to the refined materials, the production costs are high, for instance when the sealing rings are made from silver-plated INCONEL or also from Teflon-coated materials.

SUMMARY

The fuel injector according to the present invention has a sealing ring formed at a variable radius of curvature, which may be manufactured inexpensively from a copper-tin alloy, may be used repeatedly and is easy to install.

The sealing ring may have an overlap region which, due to a locking of the ends of the sealing ring into appropriate cut-outs, attains a compact and flexible form of the sealing ring.

The sealing ring may be rounded on the inside and outside, either at identical or different radii of curvature, with the result that an even thickness of the sealing ring may be obtained or a cross-section tapering toward the edges.

Exemplary embodiments of the present invention are shown schematically in the drawings and described in further detail in the following description.

DETAILED DESCRIPTION

Figure 1:
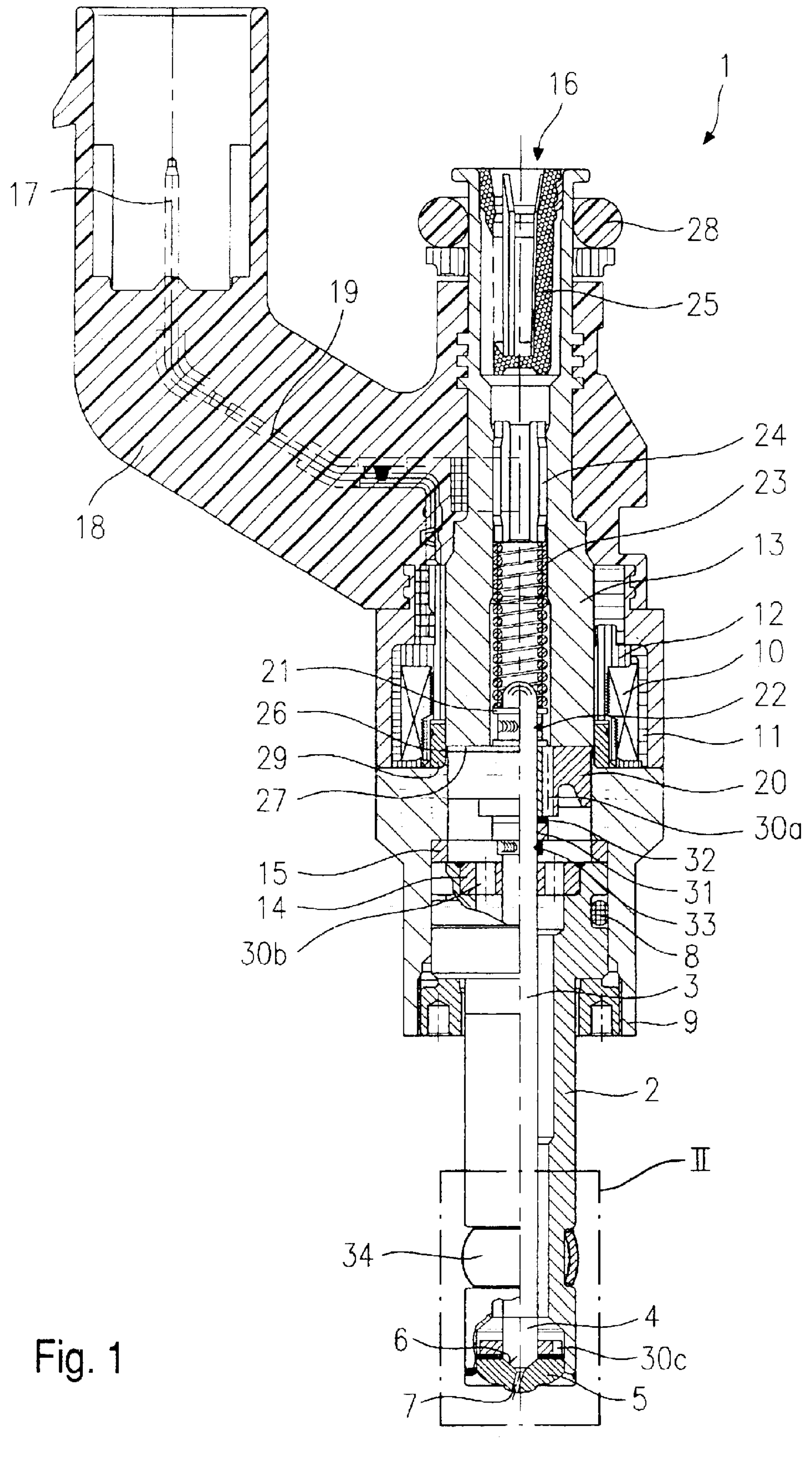
FIG. 1 is a schematic cross-sectional view of a first example embodiment of a fuel injector configured according to the present invention.
Figure 2:
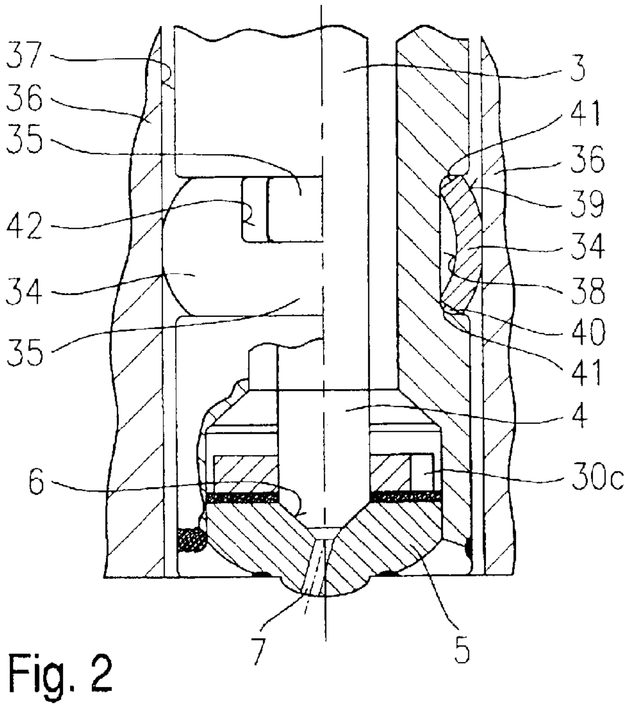
FIG. 2 is a schematic cross-sectional view of area II shown in FIG. 1 of the fuel injector configured according to the present invention.
Figure 4:
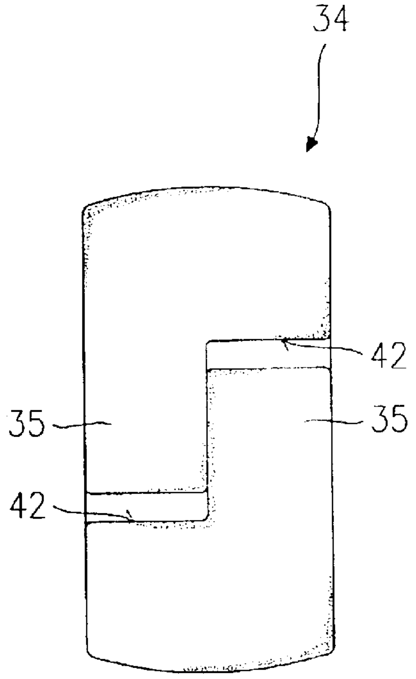
FIG. 4 a schematic view of a sealing ring.
Figure 3:
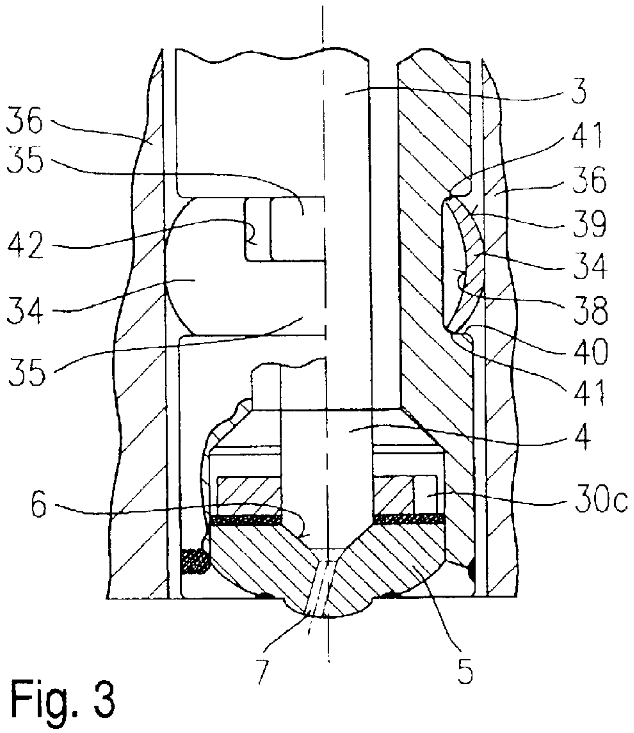
FIG. 3 is a schematic cross-sectional view, in the same area as illustrated in FIG. 2, of a second example embodiment of a fuel injector configured according to the present invention.

Before giving a more detailed description, based on FIGS. 2 through 4, of exemplary embodiments of a fuel injector 1 according to the present invention, to provide a better understanding of the present invention, a fuel injector 1 shall first of all be explained briefly in terms of its essential components with reference to FIG. 1.

Fuel injector 1 is designed in the form of a fuel injector for fuel-injection systems of mixture-compressing internal combustion engines with externally supplied ignition. Fuel injector 1 may be particularly suitable for the direct injection of fuel into a combustion chamber of an internal combustion engine.

Fuel injector 1 is made up of a nozzle body 2 in which a valve needle 3 is positioned. Valve needle 3 is in operative connection with a valve-closure member 4 that cooperates with a valve-seat surface 6, arranged on a valve-seat member 5, to form a sealing seat. In the example embodiment, fuel injector 1 is an inwardly opening fuel injector 1 which has a spray-discharge orifice 7.

Nozzle body 2 is sealed by a seal 8 from an external pole 9 of a magnetic coil 10, and by a sealing ring 34 from the cylinder head of an internal combustion engine. According to the present invention, sealing ring 34 is made from a convexly curved ring overlapping at two ends 35, from surface-profiled coiled stock, by stamping and rolling. Further depictions of the sealing ring 34 are shown in FIGS. 2 through 4.

Magnetic coil 10 is encapsulated in a coil housing 11 and wound on a coil brace 12, which abuts against an inner pole 13 at magnetic coil 10. Inner pole 13 and external pole 9 are separated from one another by a gap 26 and are braced on a connecting member 29. Magnetic coil 10 is energized via an electric line 19 by an electric current, which may be supplied via an electrical plug contact 17. A plastic coating 18, which may be extruded onto internal pole 13, encloses plug contact 17.

Valve needle 3 is guided in a valve-needle guide 14, which is disk-shaped. A paired adjustment disk 15 is used to adjust the (valve) lift. An armature 20 is on the other side of adjustment disk 15. It is connected by force-locking to valve needle 3 via a first flange 21, and valve needle 3 is connected to first flange 21 by a welded seem 22. Braced against first flange 21 is a return spring 23 which may be prestressed by a sleeve 24.

On the discharge-side of armature 20 is a second flange 31 which is used as lower armature stop. It is connected via a welding seam 33 to valve needle 3 in a force-locking manner. An elastic intermediate ring 32 is positioned between armature 20 and second flange 31 to damp armature bounce during closing of fuel injector 1.

Fuel channels 30*a* through 30*c* run through valve-needle guide 14, armature 20 and valve-seat member 5, conducting the fuel, supplied via a central fuel supply 16 and filtered by a filter element 25, to spray-discharge orifice 7. Fuel injector 1 is sealed from a distributor line by a seal 28.

In the rest state of fuel injector 1, return spring 23 acts upon first flange 21 at valve needle 3 contrary to its lift direction, so that valve-closure member 4 is retained in sealing contact against valve seat 6. Armature 20 rests on intermediate ring 32, which is supported on second flange 31. When magnetic coil 10 is energized, it builds up a magnetic field which moves armature 20 in the lift direction against the spring tension of return spring 23. Armature 20 carries along first flange 21, which is welded to valve needle 3, and thus valve needle 3 in the lift direction as well. Valve closure member 4, being operatively connected to valve needle 3, lifts off from valve seat surface 6, and the fuel guided via fuel channels 30*a* through 30*c* to spray-discharge orifice 7 is sprayed off.

When the coil current is turned off, once the magnetic field has sufficiently decayed, armature 20 falls away from internal pole 13 due to the pressure of restoring spring 23 on first flange 21, whereupon valve needle 3 moves in a direction counter to the lift. As a result, valve closure member 4 comes to rest against valve-seat surface 6, and fuel injector 1 is closed. Armature 20 comes to rest against the armature stop formed by second flange 31.

In a part-sectional view, FIG. 2 shows the section designated by II from FIG. 1 of fuel injector 1 designed in accordance with the present invention. Identical parts are provided with the same reference numerals in all of the figures.

To illustrate the method of the measures for sealing according to the present invention, FIG. 2 schematically shows a part of cylinder head 36 of the internal combustion engine. Sealing ring 34 is positioned in a groove-type recess 40 of nozzle body 2 so that it seals fuel injector 1 from cylinder head 36 of the internal combustion engine. In this context, sealing ring 34 is under a light pressure which slightly flattens the afore-mentioned convex radius of curvature of sealing ring 34, thereby producing the sealing effect. Sealing ring 34 is wedged in circumferential recess 40 by outside edges 41.

Sealing ring 34 may be manufactured by punching, from surface-profiled coiled stock, and subsequent rolling. A sealing ring 34 formed in this manner has two ends 35 which are positioned so as to axially overlap each other and to interlock in the circumferential direction. An example arrangement of this overlap is illustrated in FIG. 4.

The elastic qualities of sealing ring 34 may be ensured by manufacturing it from a copper-tin alloy or from stainless steel. The material also has good corrosion resistance and sliding characteristics. The former may provide a long service life of the sealing ring; the latter may facilitate the installation and removal of fuel injector 1, without having to replace sealing ring 34 each time, as is the case with conventional Teflon seals.

The installation of sealing ring 34 requires no specialized tools since, due to the elastic qualities, it is easy to slide it on nozzle body 2 and then lock it in recess 40. This is rendered possible by the overlapping of ends 35 of sealing ring 34, which makes sealing ring 34 variable in diameter.

An example embodiment of sealing ring 34 designed in accordance with the present invention, as shown in FIG. 2, has an identical radius of curvature for an inner side 38 and an outer side 39 of sealing ring 34. This means that the material of sealing ring 34 has an even thickness throughout.

In contrast thereto, another exemplary embodiment of a fuel injector 1 designed according to the present invention, shown in FIG. 3, has a variable thickness of sealing ring 34. In this case, the material thickness decreases toward edges 41 of sealing ring 34, due to a larger radius of curvature of inner side 38 relative to outer side 39. In the resulting form, the contact surface in recess 40 is smaller than in the example embodiment shown in FIG. 2, the installation may be easier, and the sealing effect may be improved.

FIG. 4 shows a schematic view of a sealing ring 34 according to FIG. 2 or FIG. 3 in the region of the overlap of ends 35. In this case, sealing ring 34 is turned 90° compared to the views in FIGS. 2 and 3.

To facilitate the installation, improve the elastic qualities of sealing ring 34, and enhance the sealing characteristics, sealing ring 34 is provided with an overlap region where ends 35 of sealing ring 34 interlock. In the present example embodiment, the overlap is achieved by axial locking. For that purpose, during production of sealing ring 34, cut-outs 42 are punched out at its ends 35 which, for instance, halve the axial height of sealing ring 34. During rolling of sealing ring 34, one end 35 each is inserted into opposing cut-out 42, so that a stepped axial locking is achieved. In this manner, the benefit may be derived of a constant material thickness, as compared to a complete overlapping of ends 35, which may be achieved by sliding them over one another. Depending on the diameter of receiving bore 37 of cylinder head 36, ends 35 of sealing ring 34, of variable size, interlock with one another, due to the circumferential length of cut-outs 42. In this manner, sealing rings 34 may be inserted into variably sized receiving bores 37.

The present invention is not limited to the exemplary embodiments presented, but is applicable to other cross-sectional forms of sealing rings 34, as well as to various desired construction types of fuel injectors 1, such as a fuel injector 1 having an interface to an intake manifold or a common-rail system.

What is claimed is:

1. A fuel injector, comprising:

a valve housing including a nozzle body; and a sealing ring including two ends and including a convexly curved profile configured to seal the fuel injector from a cylinder head of an internal combustion engine, the two ends of the sealing ring axially overlapping in a step-like manner, wherein a radius of curvature at an inner side of the sealing ring is the same as a radius of curvature at an outer side of the sealing ring, and wherein a direction of curvature of the inner side and that of the outer side are the same.

2. The fuel injector according to claim 1, wherein the sealing ring is configured so that a first end of the two ends is lockable into a cut-out arranged at a second end of the two ends.

3. The fuel injector according to claim 1, wherein a radius of curvature of the sealing ring corresponds to a bore radius of a bore in the cylinder head.

4. The fuel injector according to claim 1, wherein the sealing ring includes a copper-tin alloy.

5. The fuel injector according to claim 1, wherein the sealing ring is arranged in a groove-type cut-out of the nozzle body.

6. The fuel injector according to claim 5, wherein the outer edges of the sealing ring are disposed in the cut-out.

7. The fuel injector according to claim 1, wherein the fuel injector is configured for direct injection of fuel into a combustion chamber of a mixture-compressing internal combustion engine having external ignition.

8. A fuel injector comprising:

a valve housing including a nozzle body; and a sealing ring configured to seal the fuel injector from a cylinder head of an internal combustion engine, the sealing ring including two ends and a convexly curved profile, the two ends of the sealing ring axially overlapping in a step-like manner;

wherein a radius of curvature at an inner side of the sealing ring is larger than a radius of curvature at an outer side of the sealing ring.

9. A fuel injector, comprising:

a valve housing including a nozzle body; and a sealing ring configured to seal the fuel injector from a cylinder head of an internal combustion engine, the sealing ring including two ends and a convexly curved profile, the two ends of the sealing ring axially overlapping in a step-like manner;

wherein the sealing ring is configured to rest with its convexly curved profile against a wall of the bore in an installed state of the fuel injector in a bore of the cylinder head; and wherein a radius of curvature at an inner side of the sealing ring is larger than a radius of curvature at an outer side of the sealing ring.

10. A fuel injector, comprising:

a valve housing including a nozzle body; and a sealing ring including two ends and a convexly curved profile configured to seal the fuel injector from a cylinder head of an internal combustion engine, the two ends of the sealing ring axially overlapping in a step-like manner;

wherein the sealing ring is arranged in a groove-type cut-out of the nozzle body having two boundary sides running in a radial direction; and wherein the sealing ring is configured to rest against the two boundary sides with its outer edge in an installed state of the fuel injector and to extend out of the groove-type cut-out and in a bore of the cylinder head.

11. The fuel injector according to claim 10, wherein the sealing ring is configured so that a first end of the two ends is lockable into a cut-out arranged at a second end of the two ends.

12. The fuel injector according to claim 10, wherein a radius of curvature of the sealing ring corresponds to a bore radius of a bore in the cylinder head.

13. The fuel injector according to claim 12, wherein the outer edges of the sealing ring are disposed in the cut-out.

14. The fuel injector according to claim 10, wherein a radius of curvature at an inner side of the sealing ring is the same as a radius of curvature at an outer side of the sealing ring.

15. The fuel injector according to claim 10, wherein the fuel injector is configured for direct injection of fuel into a combustion chamber of a mixture-compressing internal combustion engine having external ignition.

16. A fuel injector, comprising:

a valve housing including a nozzle body; and a sealing ring configured to seal the fuel injector from a cylinder head of an internal combustion engine, the sealing ring including two ends and a convexly curved profile, the two ends of the sealing ring axially overlapping in a step-like manner;

wherein the sealing ring is arranged in a groove-type cut-out of the nozzle body having two boundary sides running in a radial direction;

wherein the sealing ring is configured to rest against the two boundary sides with its outer edge in an installed state of the fuel injector in a bore of the cylinder head; and wherein a radius of curvature at an inner side of the sealing ring is larger than a radius of curvature at an outer side of the sealing ring.

* * * * *